(No Model.)

C. C. & J. A. BISHOP.
VEHICLE SPRING.

No. 252,173. Patented Jan. 10, 1882.

Attest:
H. H. Schott
A. R. Brown

Inventor:
Charles C. Bishop
Joseph A. Bishop
by J. C. Jackn atty

UNITED STATES PATENT OFFICE.

CHARLES C. BISHOP AND JOSEPH A. BISHOP, OF NASHVILLE, TENNESSEE, ASSIGNORS TO CASWELL C. BISHOP, OF SAME PLACE.

VEHICLE-SPRING.

SPECIFICATION forming part of Letters Patent No. 252,173, dated January 10, 1882.

Application filed October 13, 1881. (No model.)

*To all whom it may concern:*

Be it known that we, CHARLES C. BISHOP and JOSEPH A. BISHOP, citizens of the United States of America, residing at Nashville, in the county of Davidson and State of Tennessee, have invented certain new and useful Improvements in Vehicle-Springs; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of our invention is to provide a light, durable, and elastic spring for side-bar and other vehicles, adapted to be used as a transverse spring in side-bar vehicles and as a longitudinal or side spring on other vehicles, the spring being so constructed and arranged as to secure an elastic but equalizing motion that will prevent pitching, rocking, or side swaying of the body of the vehicle. We attain this object by means of the particular construction and arrangement of two compound springs, each consisting of two parts arranged in pairs so as to cross or lap each other, each spring being composed of two distinct sections, of which the lower section is preferably curved upward at both ends, as hereinafter more fully described and claimed.

Figure 1:
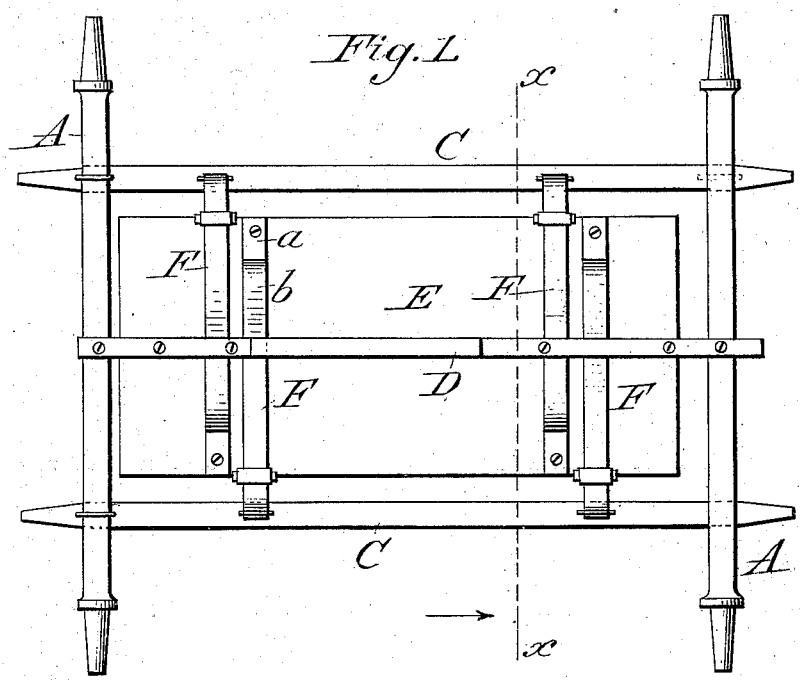
Figure 2:
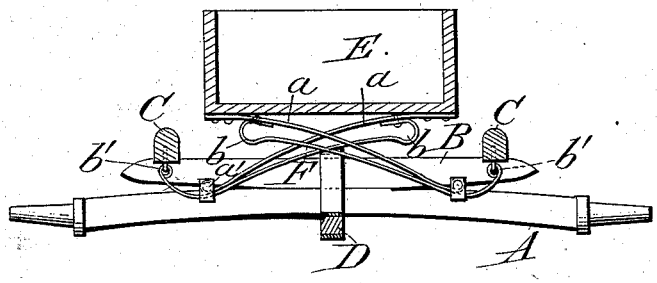
Figure 3:
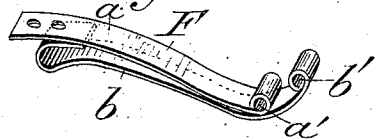

In the annexed drawings, which fully illustrate our invention, Figure 1 is a bottom plan view of a side-bar vehicle with our improved springs attached. Fig. 2 is a vertical transverse section on the line $x$ $x$, and Fig. 3 is a perspective view of the spring detached.

Like letters indicate like parts.

A A represent the axles. B is the head-block, and C C are the side bars, which are attached to and extend from the head-block to the rear axle in the usual manner. The rear axle is also connected with the forward axle and head-block by means of the reach D, which may be attached by any convenient means.

The wagon or carriage body E is supported either upon the side bars or upon the axle-bed, as preferred, by means of the springs F F, which are constructed as hereinafter more fully described.

The spring F consists of two parts arranged to cross or lap each other when applied to a vehicle, as shown in the drawings, which represent the springs attached transversely in a side-bar vehicle.

Each part or half of the spring is composed of an upper curved or inclined section, $a$, which is bolted or otherwise secured at one end to the body of the vehicle, while its opposite end is provided with a loop or eye, $a'$, by means of which it is clipped, bolt-headed, or otherwise attached to the other or lower section, $b$, which constitutes the remaining part of the half-spring.

The lower sections, $b$, of each spring are curved longitudinally, and are also reversely curved upward at both ends, one end being provided with a loop or eye, $b'$, by which it is clipped or otherwise secured to the side bar or to the axle-bed, while the other end is attached in any suitable manner to the under side of the upper section, $a$, along which it may extend for some distance, thus forming a lower plate for trussing and strengthening the same.

By this construction we secure the advantages of elasticity possessed by a long spring combined with the compactness and strength of a shorter one. The spring is consequently lighter and more durable and elastic than those heretofore used, without involving any additional expense.

The curved lower section, $b$, serves as a truss to both strengthen and support the upper section, $a$, and, being attached to the latter in the manner described and shown, equalizes the motion and prevents any tendency to rock from side to side or spring upward or forward, whether attached longitudinally or transversely.

Having thus described our invention, what we claim as new, and desire to secure by Letters Patent, is—

The springs F, composed of an upper section, $a$, adapted to be bolted at one end to the vehicle-body, and a lower section, b, upwardly curved at both ends, one of which ends is secured to the outer end of the upper section, while the opposite end is curved backward and attached to the under side of the upper section, substantially as and for the purpose shown and described.

In testimony whereof we affix our signatures in presence of two witnesses.

CHAS. C. BISHOP.
JOSEPH A. BISHOP.

Witnesses:
JNO. H. WARD,
A. J. WARREN.